(12) United States Patent
Williamson et al.

(10) Patent No.: US 9,908,391 B2
(45) Date of Patent: Mar. 6, 2018

(54) ADJUSTABLE TENSIONING MECHANISM FOR A SOFT ROLL UP TONNEAU COVER

(71) Applicant: Rugged Liner, Inc., Owosso, MI (US)

(72) Inventors: Scott Williamson, Orlando, FL (US); David Kosinski, Northville, MI (US); Michael Yang, St. Charles, IL (US); Xichang Yan, Jiangsu (CN); Jianfeng Tong, Jiangsu (CN); Chengping Wei, Jiangsu (CN)

(73) Assignee: Rugged Liner, Inc., Owosso, MI (US)

( * ) Notice: Subject to any disclaimer, the term of this patent is extended or adjusted under 35 U.S.C. 154(b) by 0 days.

(21) Appl. No.: 15/405,107

(22) Filed: Jan. 12, 2017

(65) Prior Publication Data

US 2017/0129316 A1 May 11, 2017

Related U.S. Application Data

(63) Continuation of application No. 14/854,880, filed on Sep. 15, 2015, now abandoned.

(60) Provisional application No. 62/050,355, filed on Sep. 15, 2014.

(51) Int. Cl.
*B60J 7/10* (2006.01)
*B60J 7/185* (2006.01)

(52) U.S. Cl.
CPC ............... *B60J 7/104* (2013.01); *B60J 7/185* (2013.01)

(58) Field of Classification Search
CPC .... B60P 7/04; B60P 7/068; B60J 7/068; B60J 11/00; B60J 11/04; B60J 7/104
USPC .......................... 296/100.01, 100.11, 100.12, 296/100.15–100.18
See application file for complete search history.

(56) References Cited

U.S. PATENT DOCUMENTS

| | | | |
|---|---|---|---|
| 4,607,876 A | 8/1986 | Reed |
| 4,730,866 A | 3/1988 | Nett |
| 4,991,640 A | 2/1991 | Verkindt et al. |
| 5,076,338 A | 12/1991 | Schmeichel et al. |
| 5,096,250 A | 3/1992 | Menz |
| 5,165,750 A | 11/1992 | Pirhonen |
| 5,174,353 A | 12/1992 | Schmeichel et al. |

(Continued)

FOREIGN PATENT DOCUMENTS

| | | |
|---|---|---|
| CA | 2746916 A1 | 1/2012 |
| CN | 104827873 A | 8/2015 |
| WO | WO2013/056124 A1 | 4/2013 |

OTHER PUBLICATIONS

Drawing and photocopy of a picture taken in Sep. 1999 of a tonneau cover product shown at the Big Iron Farm Show in Fargo, ND, by Shur-Co, Inc. of Yankton, SD.

(Continued)

*Primary Examiner* — Dennis H Pedder
(74) *Attorney, Agent, or Firm* — Harness, Dickey & Pierce, P.L.C.

(57) ABSTRACT

A tonneau cover system for covering a space. The system includes a frame having rails. A cover is disposed over the frame for covering the space. A block, a receiver, an anchor and a latch are all coupled to the frame. A mechanism is disposed between the block and the receiver and provides adjustment to the frame by moving the receiver, the anchor and the latch as a unit between an initial adjustment position and a final adjustment position. The mechanism also provides tension to the cover when the latch is engaging the frame.

23 Claims, 11 Drawing Sheets

(56) References Cited

U.S. PATENT DOCUMENTS

| | | |
|---|---|---|
| 5,207,262 A | 5/1993 | Rushford |
| 5,228,736 A | 7/1993 | Dutton |
| 5,251,951 A | 10/1993 | Wheatley |
| 5,275,458 A | 1/1994 | Barben et al. |
| 5,301,995 A | 4/1994 | Isler |
| 5,365,994 A | 11/1994 | Wheatley |
| 5,460,423 A | 10/1995 | Kersting et al. |
| 5,472,256 A | 12/1995 | Tucker |
| 5,584,521 A | 12/1996 | Hathaway |
| 5,655,807 A | 8/1997 | Rosario |
| 5,772,273 A | 6/1998 | Wheatley |
| 5,860,691 A | 1/1999 | Thomsen et al. |
| 5,906,407 A | 5/1999 | Schmeichel |
| 6,024,401 A | 2/2000 | Wheatley |
| 6,053,556 A | 4/2000 | Webb |
| 6,053,558 A | 4/2000 | Weldy et al. |
| 6,257,647 B1 | 7/2001 | Ninnell et al. |
| 6,293,608 B1 | 9/2001 | Dicke et al. |
| 6,386,616 B1 | 5/2002 | Wheatley |
| 6,543,835 B2 | 4/2003 | Schmeichel et al. |
| 6,568,740 B1 | 5/2003 | Dimmer |
| 6,575,520 B1 | 6/2003 | Spencer |
| 6,585,309 B2 | 7/2003 | Dicke |
| 6,607,234 B1 | 8/2003 | Schmeichel |
| 6,619,719 B1 | 9/2003 | Wheatley |
| 6,669,264 B1 | 12/2003 | Tucker |
| 6,672,644 B2 | 1/2004 | Schmeichel |
| 6,719,353 B1 | 4/2004 | Isler et al. |
| 6,752,449 B1 | 6/2004 | Wheatley |
| 6,808,220 B2 | 10/2004 | Wheatley |
| 6,808,221 B2 | 10/2004 | Wheatley |
| 6,811,203 B2 | 11/2004 | Wheatley |
| 6,814,388 B2 | 11/2004 | Wheatley |
| 6,814,389 B2 | 11/2004 | Wheatley |
| 6,824,191 B2 | 11/2004 | Wheatley |
| 6,851,738 B1 | 2/2005 | Schmeichel et al. |
| 6,893,073 B2 | 5/2005 | Wheatley |
| 6,976,724 B2 | 12/2005 | Wheatley |
| 7,008,000 B1 | 3/2006 | Schmeichel |
| 7,011,284 B2 | 3/2006 | Melius |
| 7,025,403 B2 | 4/2006 | Wheatley |
| 7,048,277 B1 | 5/2006 | Schmeichel |
| 7,066,524 B2 | 6/2006 | Schmeichel et al. |
| 7,104,586 B2 | 9/2006 | Schmeichel et al. |
| 7,150,490 B2 | 12/2006 | Malmberg et al. |
| 7,165,803 B2 | 1/2007 | Malmberg et al. |
| 7,188,888 B2 | 3/2007 | Wheatley |
| 7,204,540 B2 | 4/2007 | Wheatley |
| 7,384,090 B1 | 6/2008 | Weldy |
| 7,427,095 B2 | 9/2008 | Wheatley |
| 7,445,264 B2 | 11/2008 | Spencer et al. |
| 7,472,941 B2 | 1/2009 | Schmeichel et al. |
| 7,484,790 B2 | 2/2009 | Wheatley |
| 7,604,282 B2 | 10/2009 | Spencer et al. |
| 7,607,714 B2 | 10/2009 | Wheatley |
| 7,621,582 B2 | 11/2009 | Schmeichel et al. |
| RE41,078 E | 1/2010 | Schmeichel |
| 7,815,239 B1 | 10/2010 | Schmeichel et al. |
| 7,828,361 B1 | 11/2010 | Spencer |
| 8,033,591 B2 | 10/2011 | Schmeichel et al. |
| 8,083,281 B2 | 12/2011 | Schmeichel et al. |
| 8,128,149 B1 | 3/2012 | Wolf et al. |
| 8,146,981 B2 | 4/2012 | Huotari et al. |
| 8,167,353 B2 | 5/2012 | Schmeichel et al. |
| 8,186,740 B2 | 5/2012 | Huotari et al. |
| 8,328,267 B2 | 12/2012 | Schmeichel et al. |
| 8,336,946 B2 | 12/2012 | Schrader et al. |
| 8,439,423 B2 | 5/2013 | Schmeichel et al. |
| 8,475,096 B2 | 7/2013 | Spencer et al. |
| 8,523,266 B2 | 9/2013 | Yue |
| 8,567,843 B2 | 10/2013 | Schmeichel et al. |
| 8,573,678 B2 | 11/2013 | Yue |
| 8,596,708 B2 | 12/2013 | Schmeichel |
| 8,632,114 B2 | 1/2014 | Yue |
| 8,714,622 B2 | 5/2014 | Spencer et al. |
| 8,857,887 B1 | 10/2014 | Schmeichel |
| 8,939,494 B2 | 1/2015 | Maimin et al. |
| 9,045,069 B2 | 6/2015 | Schmeichel et al. |
| 9,056,542 B2 | 6/2015 | Schmeichel |
| 9,067,481 B2 | 6/2015 | Xu |
| 9,120,413 B2 | 9/2015 | Fink |
| 9,260,139 B2 | 2/2016 | Schmeichel |
| 9,278,611 B2 | 3/2016 | Maimin et al. |
| 9,393,854 B2 | 7/2016 | Schmeichel et al. |
| 2002/0096910 A1 | 7/2002 | Schmeichel |
| 2004/0150246 A1* | 8/2004 | Wheatley ............ B60J 7/102 296/100.16 |
| 2008/0129077 A1 | 6/2008 | Weldy |
| 2011/0169296 A1 | 7/2011 | Schrader |
| 2015/0246602 A1 | 9/2015 | Schmeichel et al. |
| 2016/0075220 A1 | 3/2016 | Williamson et al. |
| 2016/0137042 A1 | 5/2016 | Maimin et al. |
| 2016/0236555 A1 | 8/2016 | Williamson et al. |

OTHER PUBLICATIONS

Shur-Co., Inc., Oct. 1999, owner's manual.
Shur-Co., Inc., Dec. 2000, owner's manual.
ACCESS® Roll-up Cover Owner's Manual, © 1996, Agri-Cover, Inc., 8 pages.
TruXedo "Deuce2" tonneau cover system "Owner's Manual" (P/N 1117648 Rev B) was publically available on or before Sep. 13, 2013, and the Tonneau Cover System illustrated and described therein was publically on sale on or before Sep. 13, 2013.

\* cited by examiner

ADJUSTABLE TENSIONING MECHANISM FOR A SOFT ROLL UP TONNEAU COVER

RELATED APPLICATION

This application claims the benefit of U.S. Provisional Patent Application No. 62/050,355, filed on Sep. 15, 2014, the entirety of which is incorporated by reference.

FIELD OF THE INVENTION

The present invention generally relates to a protective cover for covering a space, more specifically, an adjustable system for securing and tightening the protective cover.

BACKGROUND

Protective cover assemblies having a frame and material covering the frame are well known for protecting spaces such as trailers, wagons, boats, as well as the cargo area of a pick-up truck. The frame usually includes a plurality of rails which may be disposed about the perimeter of the cargo area of the pick-up truck for supporting the material. A variety of methods to tighten and secure the material over the cargo space have been employed.

In the past, the protective cover was attached directly to the frame which defines the cargo space. Although effective, this method may result in loosening of the cover throughout various weather patterns and throughout the life of the cover. Additionally, there was no adjustment available or tension change available to account for dimensional changes in the material due to temperature or wear patterns.

In recent years, improvements have been made in an attempt to improve the fit of protective covers in order to accommodate dimensional variations of the material due to environmental changes. These improvements include various tensioning devices and the use of various methods of attaching material to the frames.

Although the prior art protective covers teach various methods of accommodating dimensional changes in the material, there remains an opportunity for a system which provides increased adjustment along with increased tension through the protective cover.

SUMMARY OF THE INVENTION AND ADVANTAGES

The present invention provides a tonneau cover system for covering a space. The system includes a frame having a header, a tail bar, and first and second side rails. The first side rail defines at least one slot. The cover is disposed over and coupled to the frame when the cover is in a closed position. The system also includes a block which is fixed to the first side rail. A receiver is included and is slidably coupled to the first side rail and coupled to the block. The tail bar is seated within the receiver when the cover is in the closed position. An anchor is slidably coupled to the first rail about the slot. The anchor is engaged with the receiver. Additionally, a latch is coupled to one of the receiver or the anchor and is additionally disposed through the slot. The latch engages the tail bar when the tail bar is seated in the receiver and the cover is in the closed position. Moreover, a mechanism is disposed between the block and the receiver in order to provide adjustment to the tail bar. The adjustment is provided by moving the receiver, the anchor and the latch as a unit between an initial adjustment position and a final adjustment position. Additionally, the mechanism provides tension to the cover when the cover is in the closed position.

Accordingly, the present invention provides a mechanism which provides increased adjustment and increased tension to the cover at various positions. Additionally, the present invention allows the cover system to be quickly and easily adjusted in any of the above manners, when the cover may endure dimensional changes in the material due to wear or temperature change.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Figure 1:
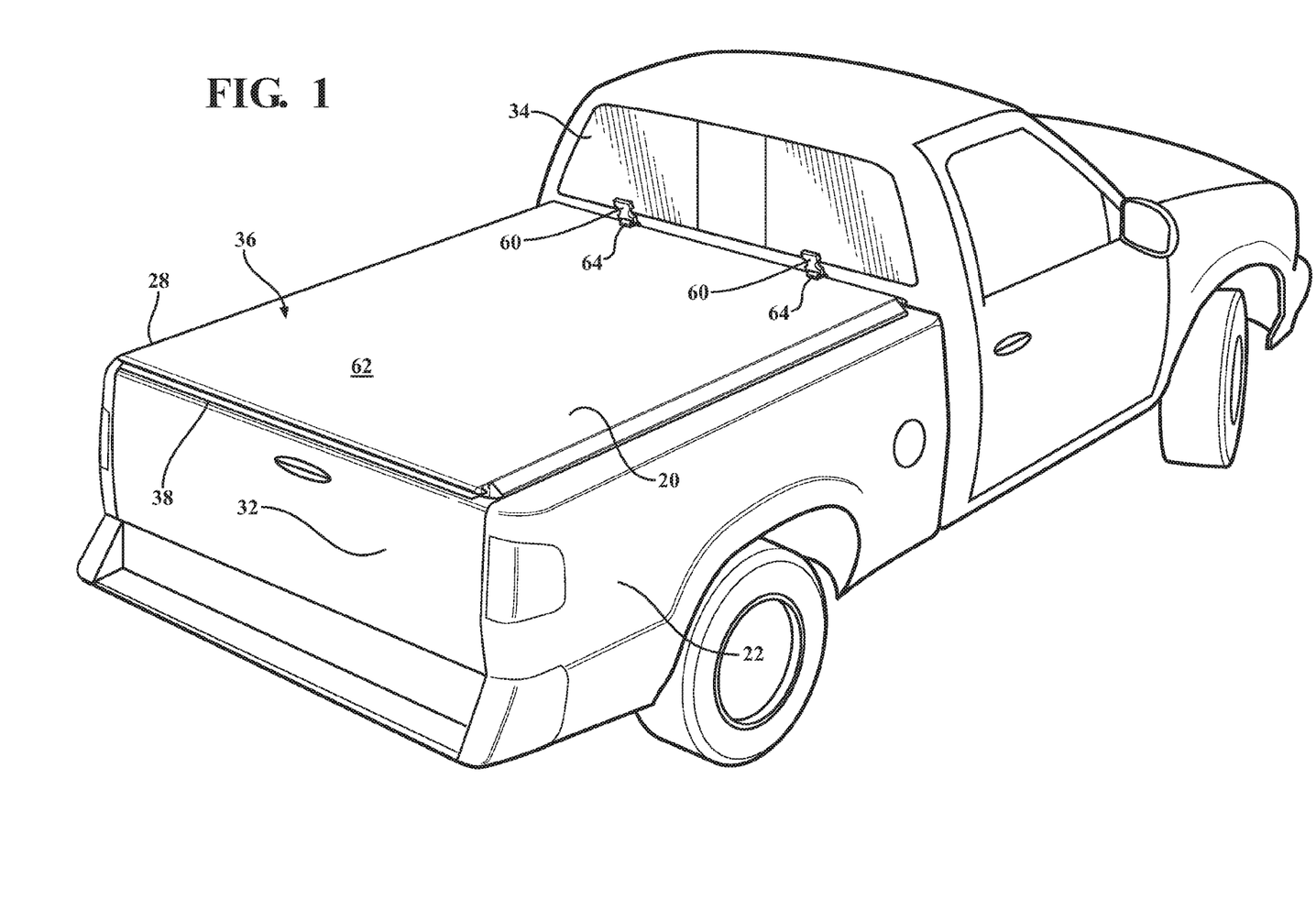
FIG. 1 is a perspective view of a pick-up truck with a protective cover covering a cargo area.

Referring to the figures, wherein like numerals indicate like or corresponding parts throughout the several views, a protective or tonneau cover is generally shown at 20. Referring to FIG. 1, the cover 20 may be adapted to be coupled to a plurality of walls 22 which define a space 24. The walls 22 include a right side wall 26 and a left side wall 28 with the left side wall 28 spaced from and substantially parallel to the right side wall 26. The walls 22 further include a front wall 30 and a rear wall 32, where the rear wall 32 is spaced from and substantially parallel to the front wall 30. Typically, the front wall 30 and the rear wall 32 are substantially perpendicular to the right side wall 26 and the left side wall 28. The space 24 defined by the walls 22 may be a cargo bed of a pick-up truck as illustrated in FIG. 1 such that the rear wall 32 is a tailgate and the front wall 30 engages a cab 34 of the pick-up truck. However, the subject invention is not limited to such an application.

As best shown in FIG. 1, the protective cover 20 is disposed on the walls 22 defining the space 24. The space 24 is typically covered completely by the cover 20 when the cover 20 is in a closed position 36, as shown in FIG. 1. The cover 20 in disposed over and coupled to the frame 40 when the cover 20 in in the closed position 36. The cover may also include a seal 38 which may be disposed over the rear wall 32 when the cover 20 is in the closed position 36.

Figure 2:
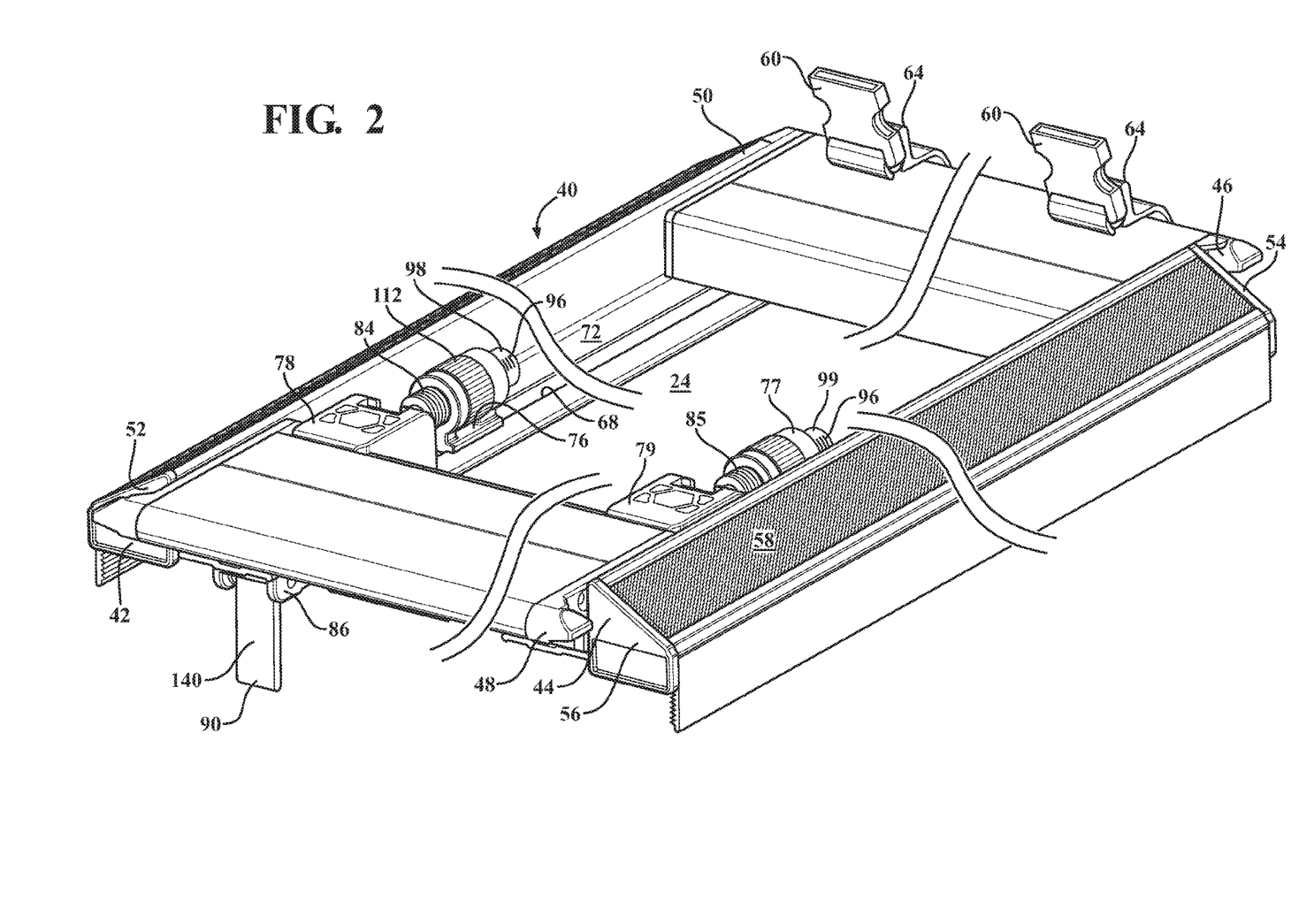
FIG. 2 is a fragmented top perspective view of a frame with the cover removed.

As best shown in FIGS. 1-2, the cover 20 is disposed over and coupled to a frame 40, which is disposed on the walls 22 and further defining the space 24. The frame 40 includes a first side rail 42, a second side rail 44, a header 46 and a tail bar 48. The first side rail 42 has a first end 50 and a second end 52, the first end 50 being coupled to the header 46 and the second end 52 being coupled to the tail bar 48. Additionally, the second side rail 44 includes a first end 54 and a second end 56 and is substantially parallel to the first side rail 42. The first end 54 of the second side rail 44 is coupled to the header 46 and the second end 56 of the second side rail 44 is coupled to the tail bar 48. The header 46 and the tail bar 48 are disposed substantially parallel to each other and the header 46 and tail bar 48 are disposed substantially perpendicular to the first side rail 42 and the second side rail 44. The first side rail 42 and the second side rail 44 include an outside portion 58 adapted to be coupled to the right side wall 26 and the left side wall 28, respectively. The cover 20 may also include a hook and loop fastener or other adhesive disposed on an underside of the cover 20. The hook and loop fastener or other adhesive may engage a complementary section disposed on an outside portion 58 of the right side wall 26 and the left side wall 28.

At least one upper buckle 60, and as shown in FIG. 2, typically two upper buckles 60, are disposed on a top surface 62 of the cover 20. The upper buckles 60 are held in place by buckle holders 64 which are disposed approximately one third of the way and two-thirds of the way from the first side rail 42 in relation to the second side rail 44. The buckle holders 64 are constructed and arranged to hold down the upper buckles 60 such that when the cover 20 is in the closed position 36, the upper buckles 60 remain disposed the top surface 62 of the cover 20 and do not move upwards to engage the cab 34. As such, the buckle holders 64 prevent undesirable noise from the upper buckles 60 hitting against the cab 34 of the truck during operation. Additionally, the upper buckles 60 may be configured to hold the cover 20 in place when the cover 20 is in a rolled up position 66, as described in more detail below in reference to FIGS. 5 and 6.

At least one stabilizing bar may be disposed parallel to the header 46 and may engage both the first side rail 42 and the second side rail 44. The stabilizing bar may be constructed and arranged to prevent sagging of the cover 20 when the cover 20 is in the closed position 36. It is contemplated that the stabilizing bar may be rolled up along with the cover 20 when the cover 20 is in the rolled up position 66 (shown in FIG. 6). Additionally, it is contemplated that there may be more than one stabilizing bar and typically two stabilizing bars spaced evenly from the header 46 and tail bar 48.

Figure 3:
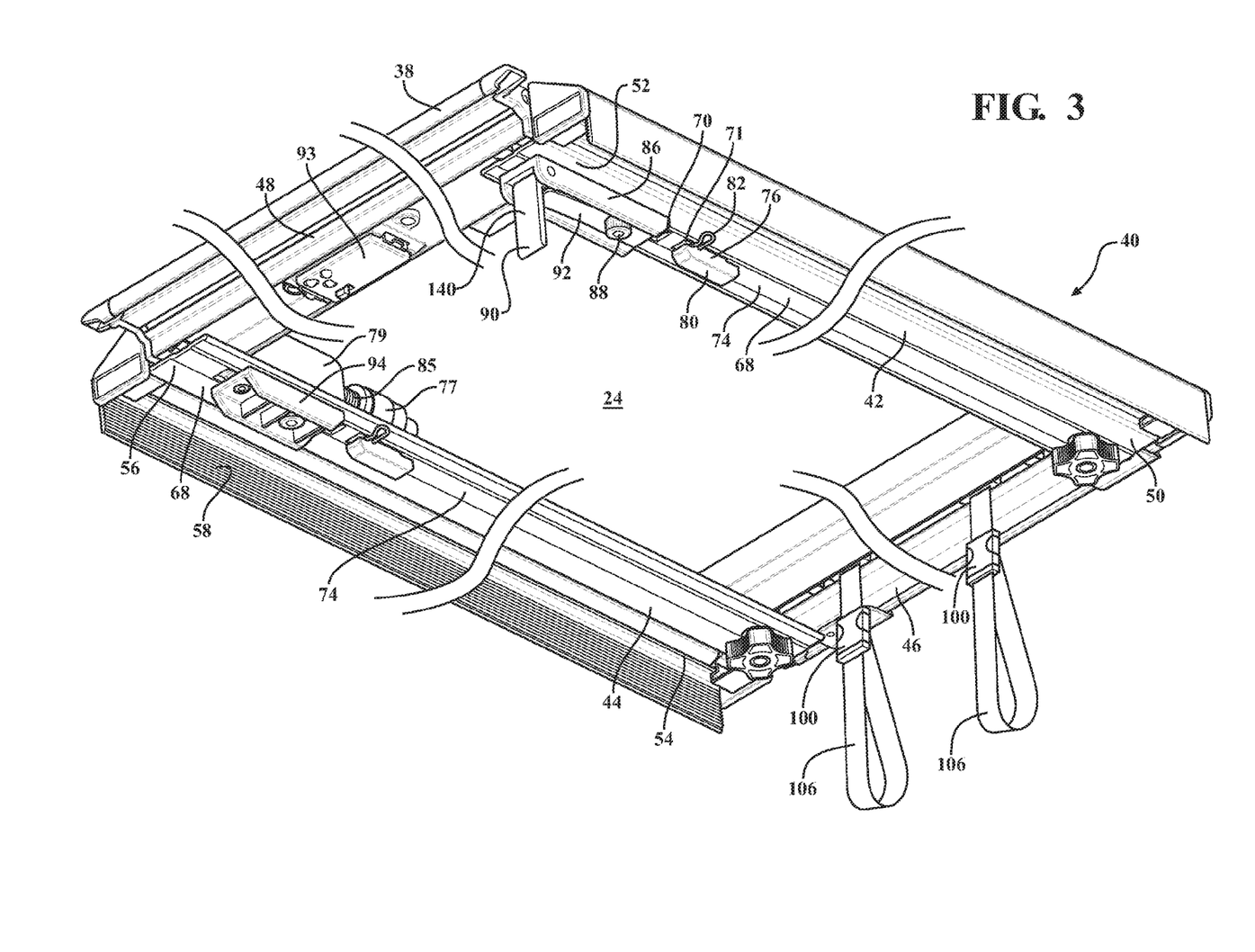
FIG. 3 is a fragmented bottom perspective view of the frame with the cover removed.

Referring now to FIGS. 2 and 3, the first side rail 42 may include an extrusion portion 68. Additionally, the first side rail 42 defines at least one slot 70 (shown in FIG. 8). The extrusion portion 68 has a top face 72 and a bottom face 74. A block 76 is fixed to the first side rail 42. Moreover, a receiver 78 is slidably coupled to the first side rail 42. The block 76 and a receiver 78 are disposed about the slot 70 with the receiver 78 coupled to the block 76. The block 76 is typically fixed to the extrusion portion 68. Additionally, as shown in FIG. 3, the block 76 may be disposed in a second slot 71 such that a portion of the block 76 is disposed through the second slot 71 and a bottom portion 80 of the block 76 is disposed on the bottom face 74 of the extrusion portion 68. It is contemplated that the first slot 70 and the second slot 71 may be configured to be one continuous slot or may be two separate slots. As illustrated in FIG. 3, the block 76 may be additionally fixed to the extrusion portion using a clip 82. The clip 82 is disposed on the bottom face 74 of the extrusion portion 68 and around the bottom portion 80 of the block 76.

A mechanism 84 is disposed between the block 76 and the receiver 78. The receiver 78 may also be disposed on the extrusion portion 68 of the first rail 42. As illustrated in FIG. 2, the receiver 78 may be disposed on a top face 72 of the extrusion portion 68. As illustrated in FIG. 3, the receiver 78 is engaged with an anchor 86. The anchor 86 is slidably coupled to the first side rail 42 about said slot 70. The anchor 86 is disposed on the bottom face 74 of the extrusion portion 68. Moreover, both the receiver 78 and the anchor 86 may be disposed about the slot 70 and a portion of the receiver 78 may be disposed through the slot 70 and/or a portion of the anchor 86 may be disposed through the slot 70. However, typically the receiver 78 is disposed through the slot 70 and the anchor 86 is disposed on the bottom face 74 of the extrusion 68. The receiver 78 and anchor 86 may include various fasteners 88 in order to couple the receiver 78 and the anchor 86.

As best illustrated in FIG. 3, a latch 90 may be coupled to one of the receiver 78 and the anchor 86. The latch may be pivotally mounted on the anchor 86. It is contemplated that the latch 90 may be disposed through the slot 70. It is additionally contemplated that the anchor 86 may include an aperture which the latch 90 is disposed therethrough. A spring bias mechanism 92 is engaging the latch 90. The spring bias mechanism 92 biases the latch 90 toward a locked position. The spring bias mechanism 92 may be a flat spring, or another spring as desired by one of ordinary skill in the art. The spring 92 may also be coupled to the anchor 86.

As illustrated in FIGS. 2 and 3, the second side rail 44 may include many of the features described above including but not limited to a second extrusion portion 69, an at least one second slot 71, a second block 77, a second receiver 79, and a second mechanism 85. The second mechanism 85 further includes a second spring biased piston 115 having a second cap 99 mounted to a second threaded portion 117 to close one end of a second interior cavity 119. The second cap 99 also includes a second set of gradient markings such that the first mechanism 84 and the second mechanism 85 can align to provide even adjustment to the tail bar 48. The second side rail 44 may further include a holder 94 disposed on a bottom face 75 of the second extrusion portion 69 coupled to the second receiver 79. The holder 94 may include similar features with respect to the anchor 86; however, the holder 94 does not have the latch 90 disposed there through.

Referring again to FIG. 3, a light 93 may be coupled to the tail bar 48. The light 93 may be an LED light or another light as known by one of ordinary skill in the art. Additionally, the light 93 may be removably attached to the tail bar 48 such that a user can easily remove and reattach the light 93 for use outside of the cover system. Moreover the light 93 may include a magnetic portion or adhesive portion allowing the user to removably attach the light 93 to a spot outside of the cover system.

Figure 4:
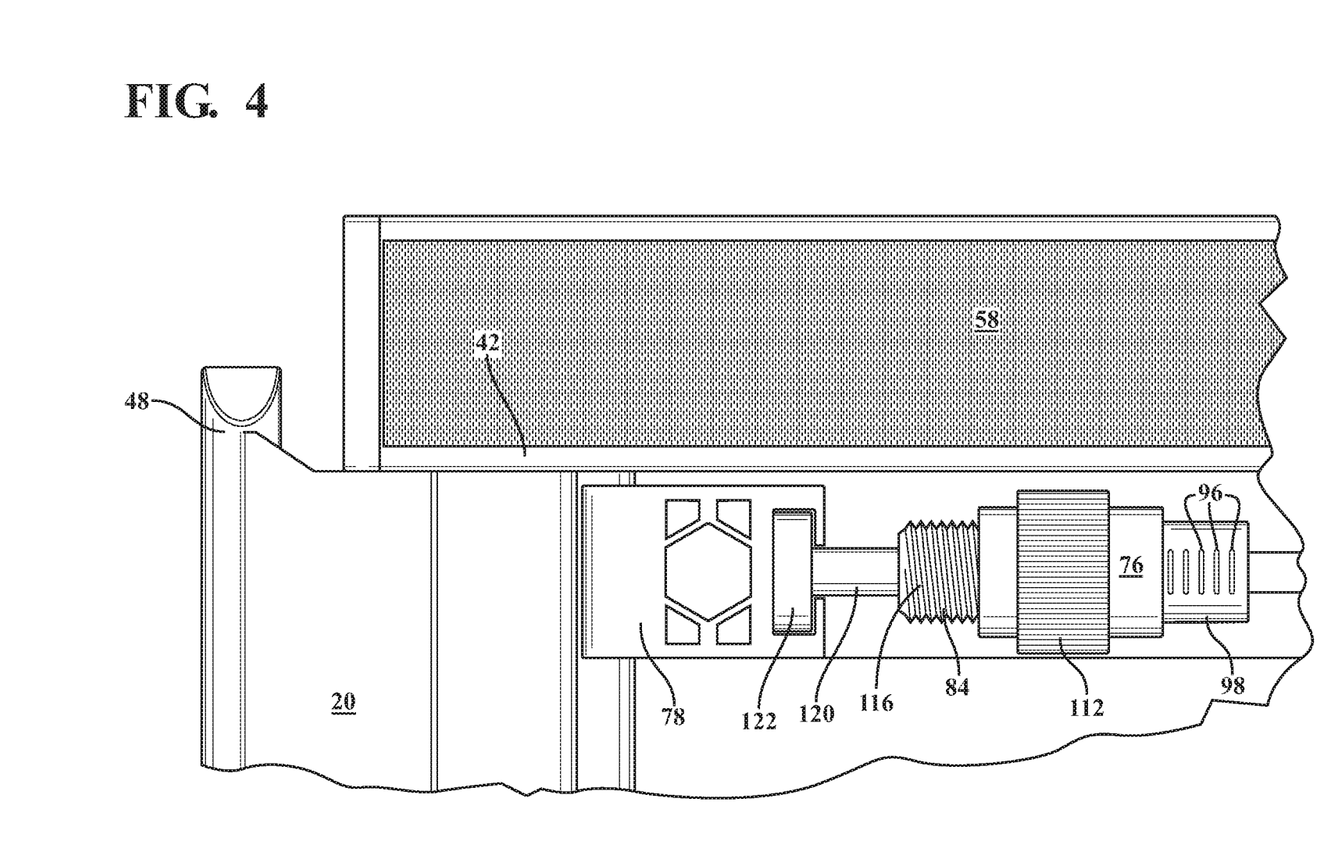
FIG. 4 is top view of a portion of the frame have a portion of the cover removed.

Referring now to FIG. 4, in order to help align the receiver 78, anchor 86, latch 90 and mechanism 84 on the first side rail 42 with the second receiver 79, the holder 94, and the second mechanism 85 on the second side rail 44, both the first mechanism 84 and the second mechanism 85 may include gradient markings 96 disposed along the length of the first and second spring biased pistons 114. Specifically, a first set and a second set of gradient markings 96 are typically disposed on a cap 98 of the mechanism 84. The gradient markings 96 may be circular such that the gradient markings 96 are disposed completely around the cap 98 of the mechanism 84 in small increments allowing a user easily align each side which eliminates need for readjustment due to the cover 20 being uneven when in the closed position 36.

Referring again to FIG. 3, the frame 40 may also include at least one lower buckle 100, and typically two lower buckles 100, which are disposed hanging from the header 46. It is contemplated that the lower buckles 100 may include both lower male 102 and lower female buckles 104, which may be mated together (FIG. 5) while the cover 20 is unrolled or in the closed position 36 in order to prevent the lower buckles 100 from hitting against the front wall 30 during movement of the vehicle. Mating the lower male 102 and lower female 104 buckles will prevent undesirable banging sounds for the driver and passengers of the vehicle.

Figure 6:
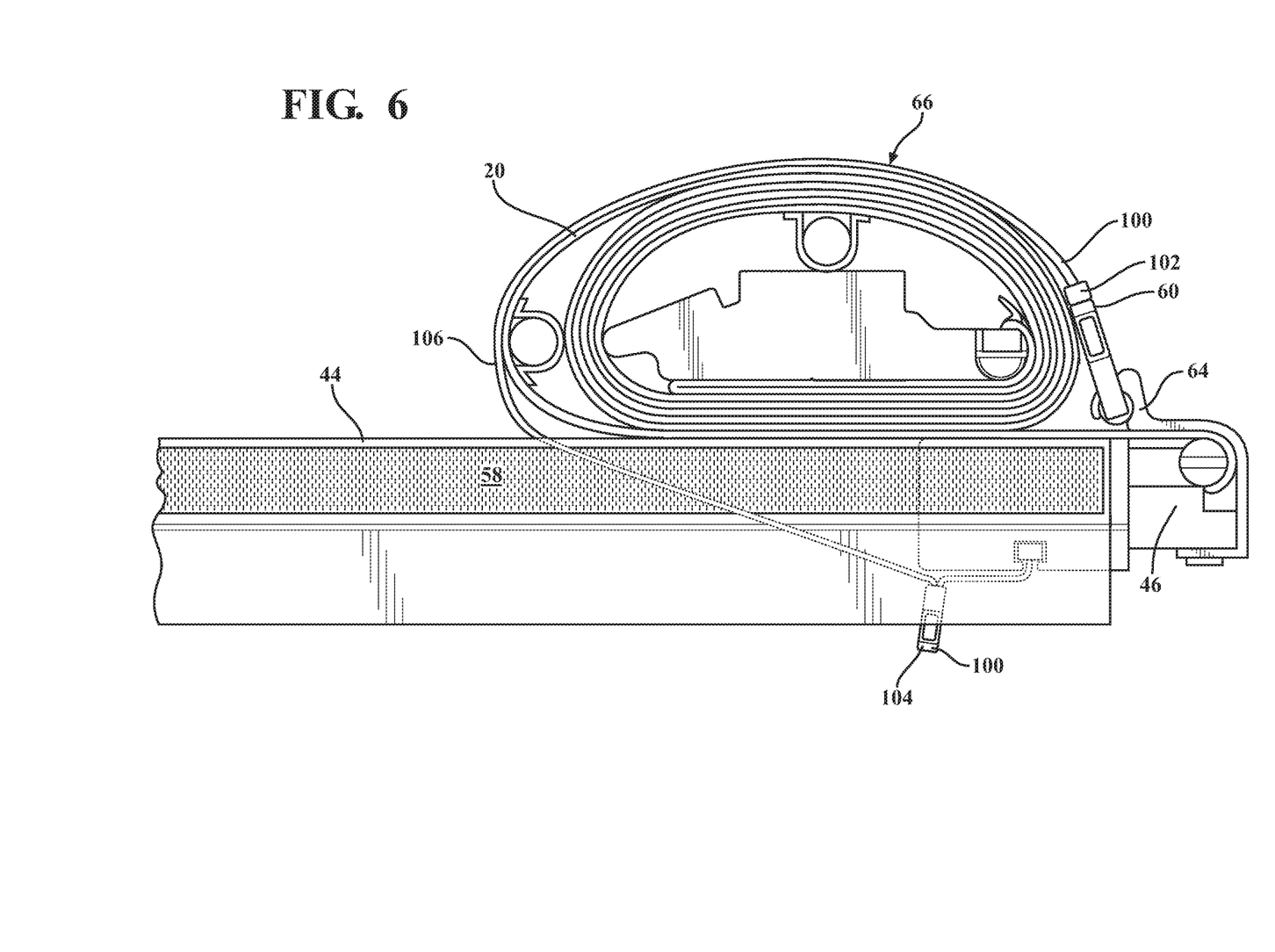
FIG. 6 is a side view of a portion of the frame having the cover in a rolled-up position.

Referring now to FIG. 6, when the cover 20 is in the rolled up position 36, the lower male buckles 102 will be unmated from the lower female buckles 104 and mated with the upper buckles 60. As illustrated in FIG. 6, straps 106 holding the lower male buckles 104 will wrap around the cover 20 in the rolled up position 66 and engage the corresponding upper buckles 60 in order to securely hold the cover 20 in the rolled up position 66.

Figure 7:
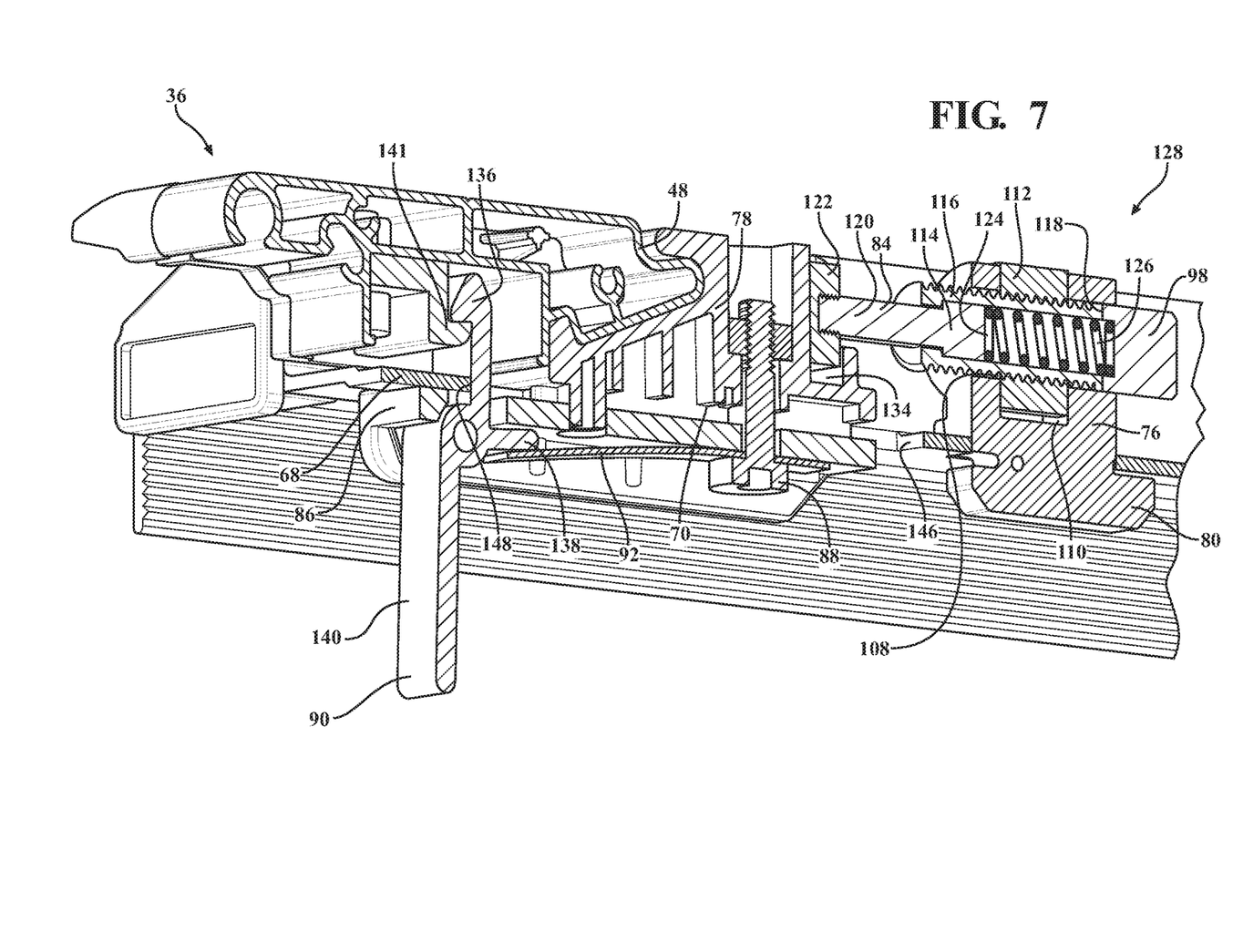
FIG. 7 is a cross-sectional side perspective view of a first side rail of the frame.

Referring now to FIG. 7, the block 76 may define a bore 108 and channel 110. The mechanism may include an adjustment nut 112. The adjustment nut 112 is disposed in the channel 110 of the block 76. Additionally, the mechanism 84 may include a spring biased piston 114. The spring biased piston 114 includes a threaded portion 116 defining an interior cavity 118, a rod 120 partially disposed within the interior cavity 118, an enlarged end 122, and the cap 98 mounted to the threaded portion 114 to close one end of the interior cavity 118. The threaded portion 116 of the spring biased piston 114 is disposed through the bore 108 of the block 76. Additionally, the adjustment nut 112 is threadably engaged with the threaded portion 116 of the spring biased piston 114. The spring biased piston 114 may include various gradient markings 96 disposed along the length of the spring biased piston 114.

As illustrated in FIG. 7, the interior cavity 118 of the spring biased piston 114 includes a spring-biased mechanism 124. The spring biased mechanism 124 includes a spring 126 which is disposed in order to provide tension to the cover 20 when the cover 20 is in the closed position 36. The spring 126 is disposed in the interior cavity 118 abutting the rod 120 to bias the rod 120 out of the interior cavity 118. The spring 126 may be a tension spring, a compression spring, a torsion spring, or any other spring or biasing member. When the cover 20 is in the closed position 36, the spring-biased mechanism 124 is in an actuated position 128. When the cover 20 is in an open position 130, the spring biased mechanism 124 is in a rest position 132.

The rod 120 of the spring-biased piston 114 extends towards the tail bar 48 from the threaded portion 116 and is disposed between the block 76 and the receiver 78. The enlarged end 122 of the spring biased piston 114 is disposed on the tail bar side of the rod 120. Additionally, the enlarged end 122 is coupled to the receiver 78. As illustrated in FIG. 4, the receiver 78 may include a channel 134 (shown in FIG. 7) which allows the enlarged end 122 to be secured within the receiver 78 which allows the mechanism 84 to move the receiver 78, anchor 86 and latch 90 as a unit.

Referring still to FIG. 7, it is contemplated that the receiver 78 may be constructed and arranged such that the tail bar 48 may be seated with the receiver 78 when the cover 20 is in the closed position 36. The receiver 78 may also have the fastener 88 disposed therethrough. The fastener 88 may is disposed through the spring bias mechanism 92, the anchor 86, and the receiver 78.

Referring still to FIG. 7, the latch 90 may include a pawl 136 for engaging the tail bar 48, a tab 138 for engaging the spring bias mechanism 92, and a handle 140. The handle 140 is disposed below the anchor 80 such that the handle 140 is visible to a user when the tailgate or rear wall 32 is open. Additionally, the pawl 136 may be constructed and arranged to engage the tail bar 48 when the cover 30 is in the closed position 36. Moreover, the tail bar 48 includes a striker 141. The striker 141 is adjustable and replaceable and configured to engage the latch 90 when the cover is in the closed position 36. It is also contemplated that the tail bar 48 does not include a striker 141 but instead includes a extruded portion which is configured to engage the latch 90.

Figure 8:
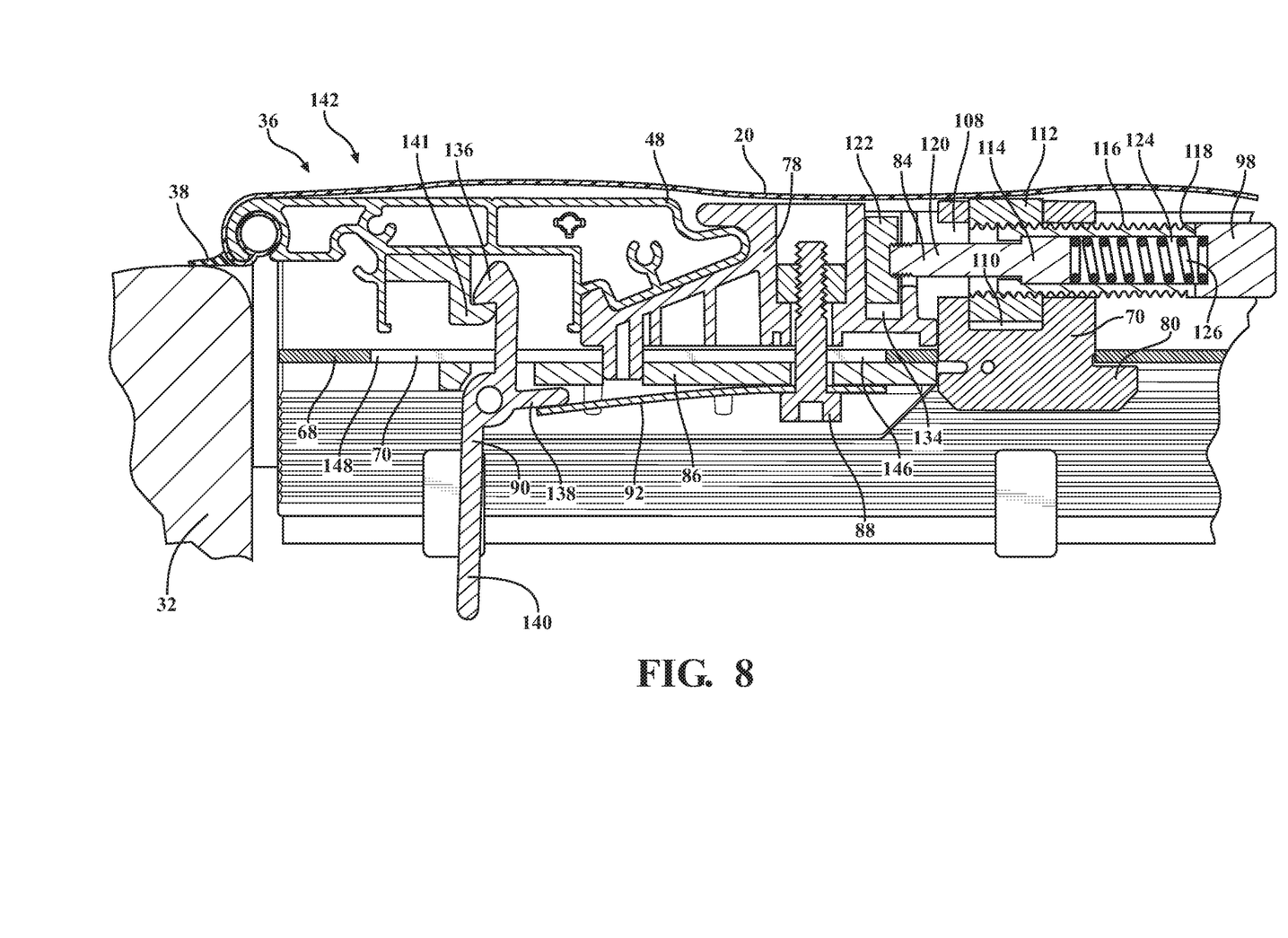
FIG. 8 is a cross-sectional side view of the first side rail having a mechanism in an initial adjustment position.
Figure 9:
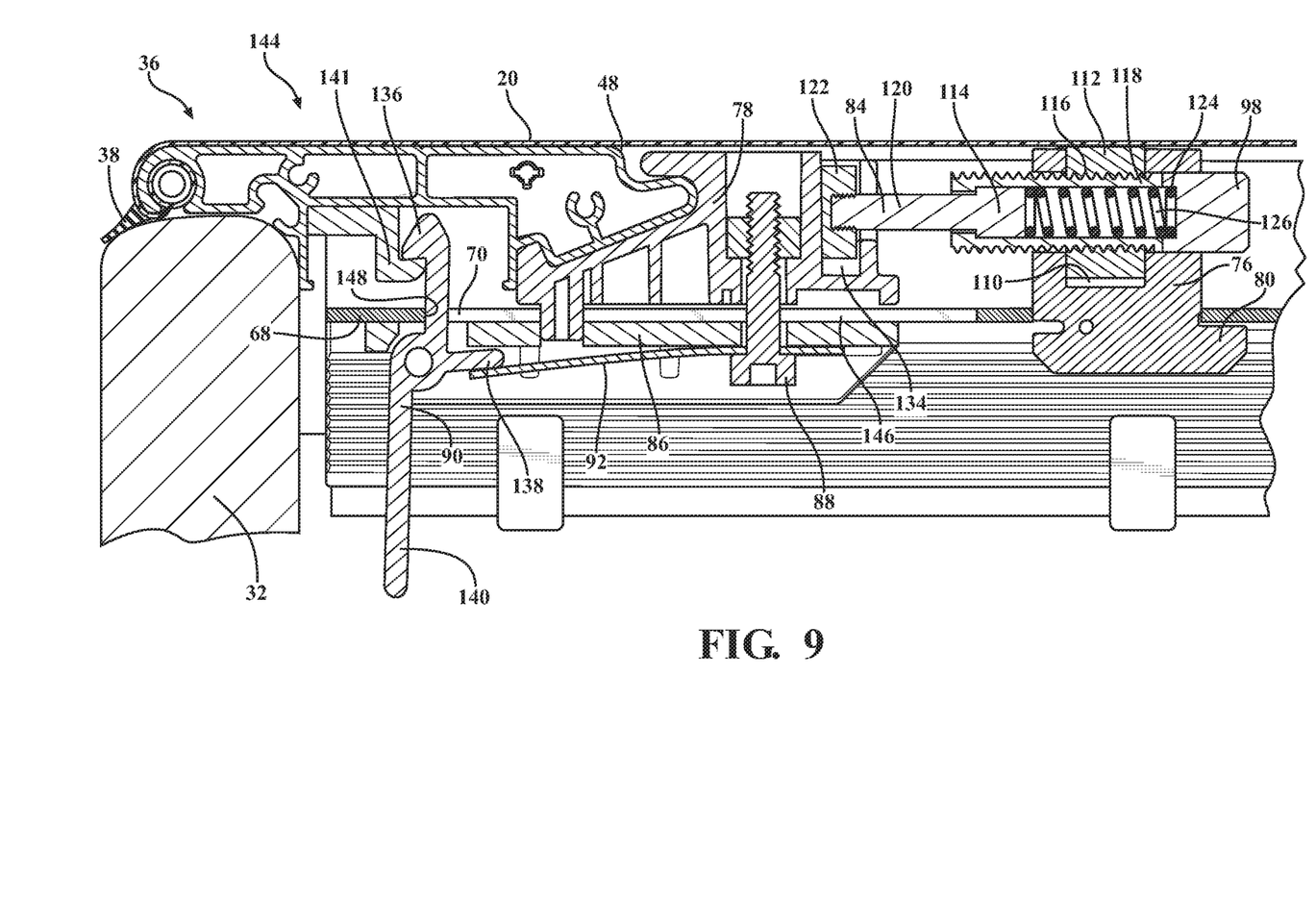
FIG. 9 is a cross-sectional side view of the first side rail having the mechanism in a final adjustment position.

Referring now to FIG. 8, it is contemplated that the mechanism 84 provides adjustment to the tail bar 48 by moving the receiver 78, the anchor 86, and the latch 90 as a unit between an initial adjustment position 142 (as shown in FIG. 8) and a final adjustment position 144 (as shown in FIG. 9). The receiver 78, anchor 86, and latch 90 may be moved as a unit anywhere between the initial adjustment position 142 and the final adjustment position 144. The initial adjustment position 142, as illustrated in FIG. 8, occurs when the latch 90 comes into abutting contact with a rear end 146 of the slot 70. The receiver 78, the anchor 86, and the latch 90 are moved between the initial adjustment position 142 and the final adjustment position 144 by moving the adjustment nut 112 along the threaded portion 116 of the spring biased mechanism 114 which moves the mechanism 84 and in turn moves the receiver 78, anchor 86 and latch 90 as a unit.

Referring now to FIG. 9, to move into the final adjustment position 144, the latch 90 the receiver 78 and anchor 86 move toward the block 76. The final adjustment position 144 occurs when the fastener 88 reaches a front end 148 of the slot 70 or when the receiver 78 or anchor 86 comes into contact with the block 76, whichever comes first.

As illustrated in FIGS. 8 and 9, when the receiver 78, the anchor 86 and the latch 90 move as a unit between the initial adjustment position 142 and the final adjustment position 144, the position of the tail bar 48 is ultimately moved. When the tail bar 48 is moved further towards the tailgate or rear wall 32, it is contemplated that the cover 20 receives more tension such that the cover 20 may have a tighter and more flat appearance which is desirable to the user. The adjustment from the initial adjustment position 142 to the final adjustment position 144 provides compensation for material wear and temperature changes which may occur to the cover 20 and provides the user with a tight cover 20, when the cover 20 is in the closed position 36.

Figure 5:
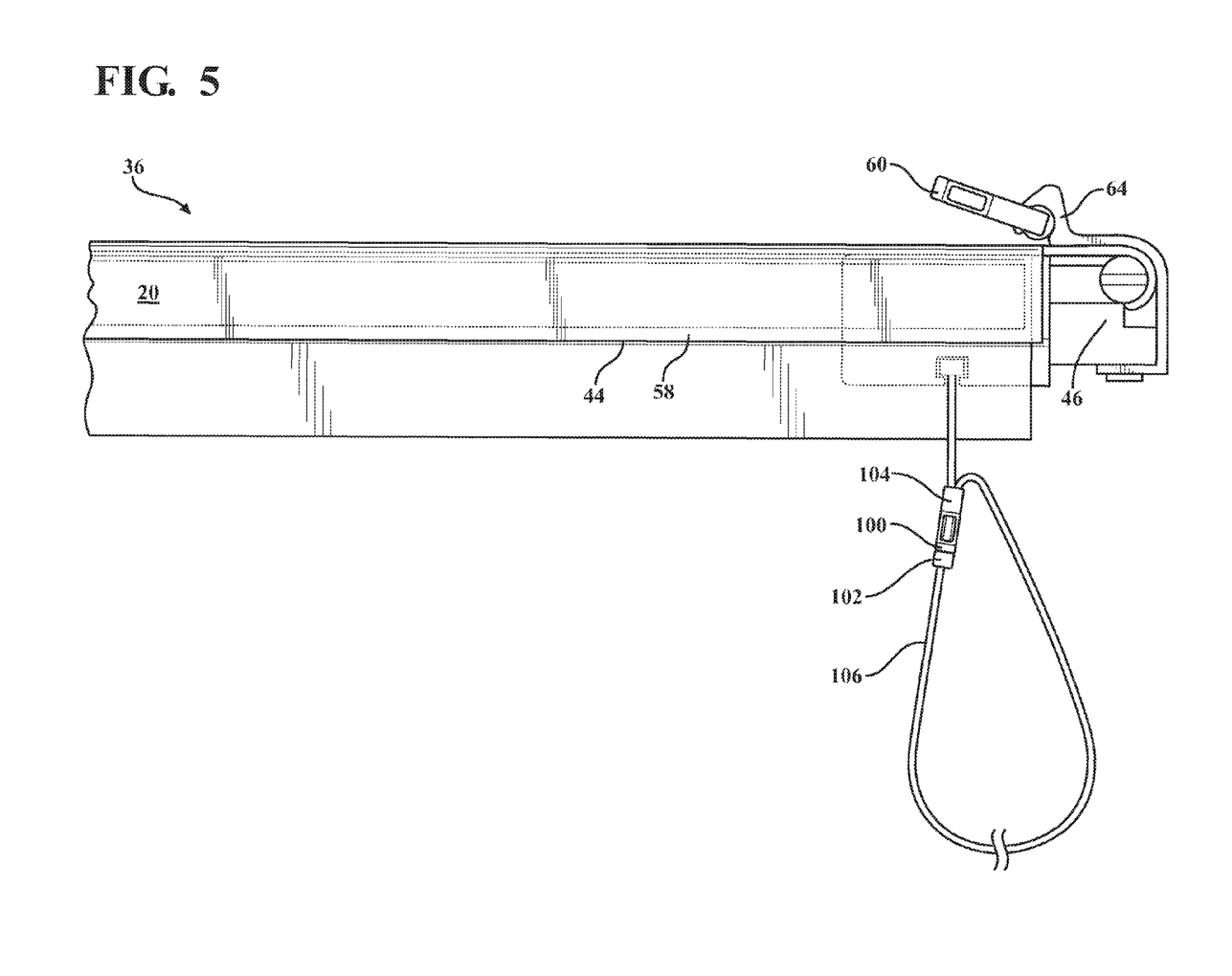
FIG. 5 is a side view of a portion of the frame having the cover in a closed position.
Figure 10:
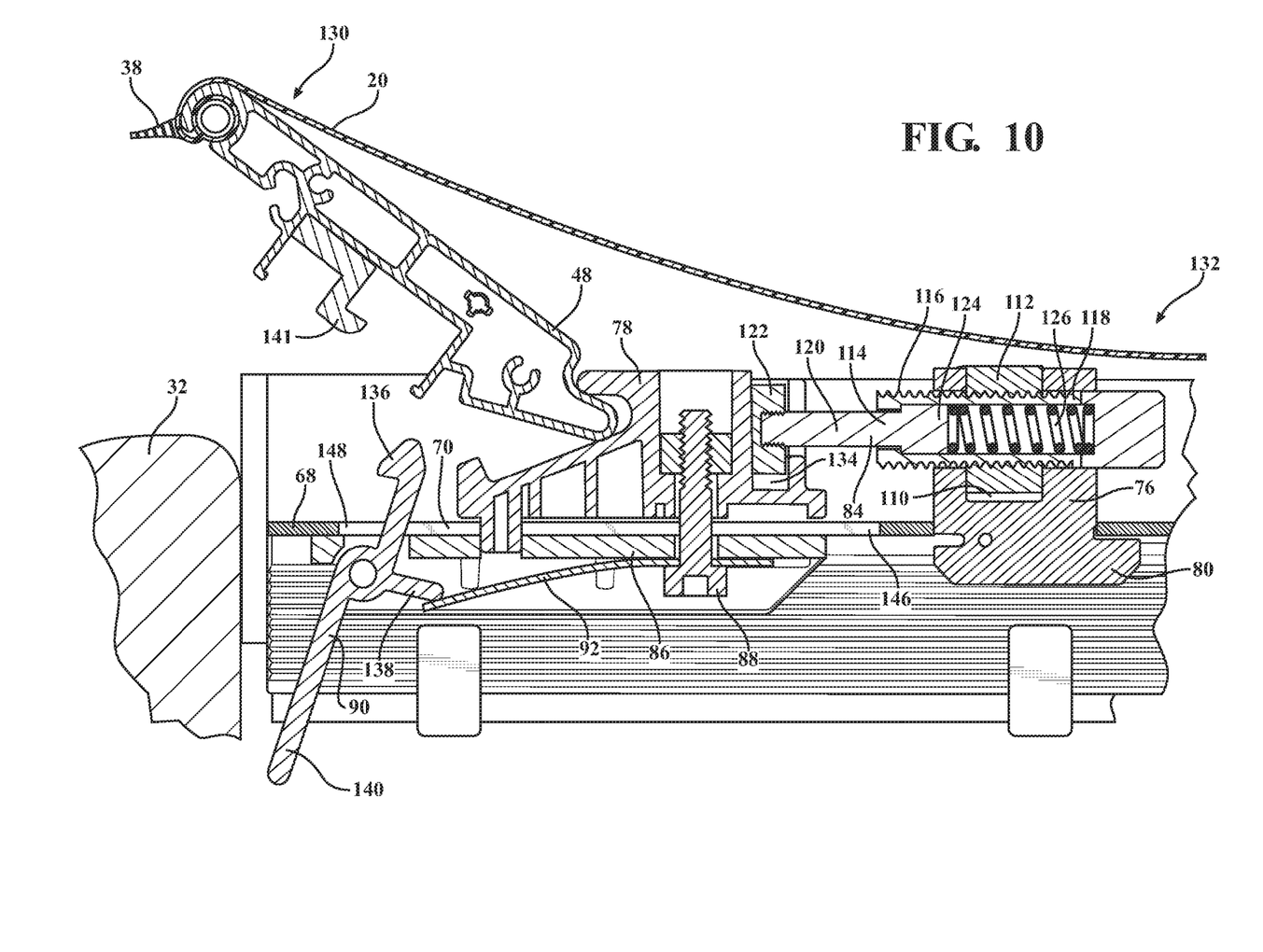
FIG. 10 is a cross-sectional side view of the first side rail having the mechanism in a rest position.
Figure 11:
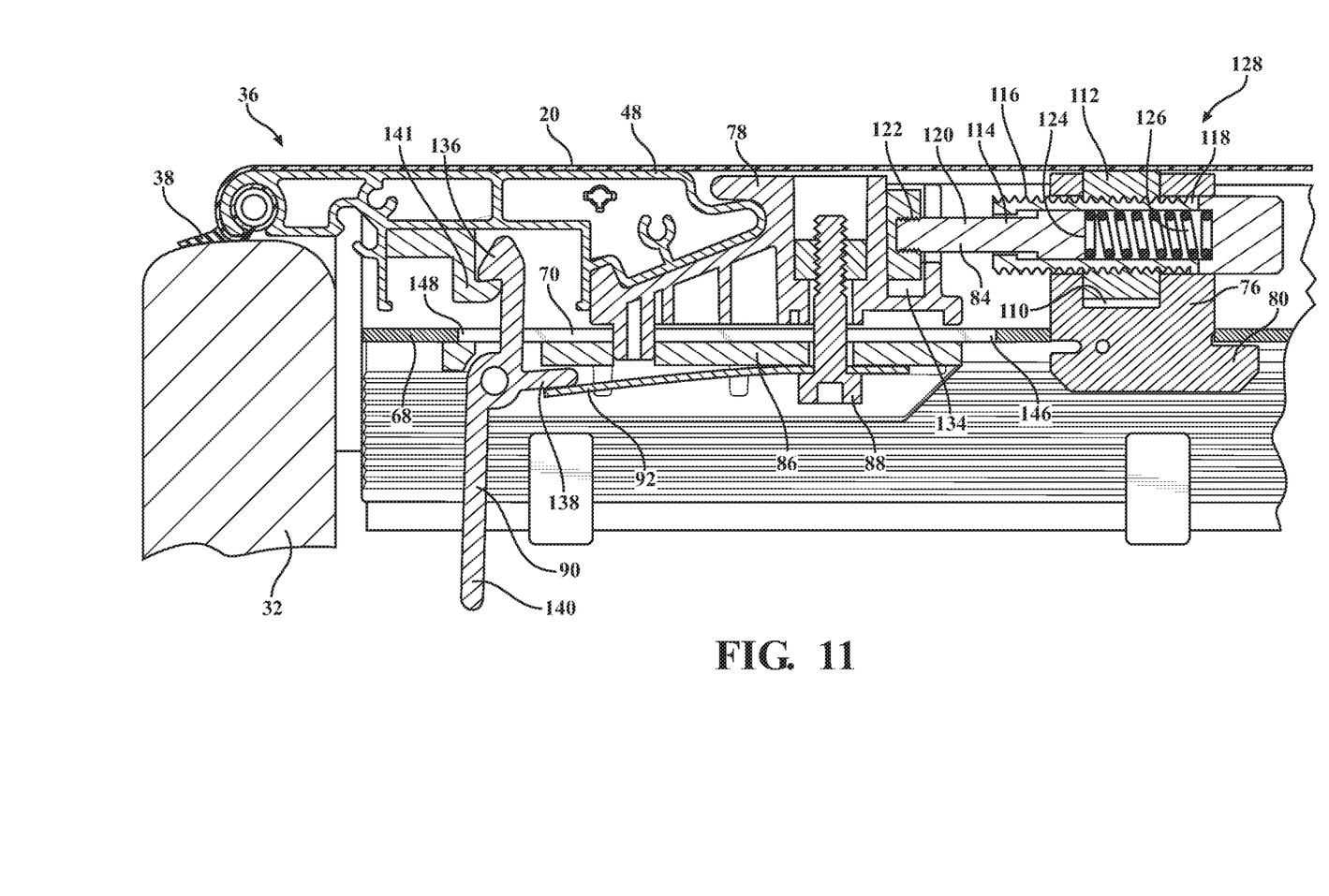
FIG. 11 is a cross-sectional side view of the first side rail having the mechanism in an actuated position

Referring now to FIGS. 8 through 11, the mechanism 84 additionally provides tension to the cover 20 when the cover 20 is in the closed position 36. The spring-biased piston 114 is configured to be in the rest position 132, as shown in FIG. 10 and in the actuated position 128 as shown in FIGS. 5 and 6. In the rest position 132, the latch 90 is disengaged from the tail bar 48. Additionally, in the rest position 132, the tail bar 48 is disposed about the receiver 78, but the tail bar 48 is not seated in the receiver 78. The rest position 132 allows the user to roll up the cover 20 and the cover to be in the rolled up position 66. In the actuated position 128 as illustrated in FIG. 11, the latch 90 is engaging the tail bar 48, and the tail bar 48 is seated in the receiver 78. The actuated position 128 also corresponds with the cover 36 being in the closed position 36. The closed position 36 of the cover 20 provides a full and tight barrier to the space. While in the rest position 132, the mechanism 84 may provide adjustment to the tail bar 48 by moving the receiver 78, the anchor 86, and the latch 90 as a unit between the initial adjustment position 142 and the final adjustment position 144. As such, the receiver 78, the anchor 86, and the latch 90 may be disposed in any position including and between the initial adjustment position 142 and the final adjustment position 144 when the spring-biased piston 114 is in the actuated position 128.

It is contemplated that the mechanism 84 provides tension to the cover 20 between a first tension position and a second tension position. The adjustment between the first tension position and the second tension position occurs automatically. The adjustment between the first tension position and the second tension position maintains a taught cover 20 due to small changes in the dimensions of the cover due to temperature changes.

For illustrative purposes only, the discussion of the operation and adjustment of the cover 20 will be described below. The cover 20 is initially unrolled over the frame 40 until an underside of the tail bar 48 is fully exposed and the tail bar 48 is placed about the receiver 78. Prior to the unrolling of the cover 20 from the rolled-up position 66, the mechanism 84 may move the receiver 78, the anchor 86, and the latch 90 between any position as desired by the user. Once the cover 20 is unrolled and the underside of the tail bar 48 is exposed and placed about the receiver 78, the user may then push the handle 140 of the latch 90 such that the latch 90 engages the tail bar 48 and the tail bar 48 becomes seated in the receiver 78. It is also contemplated that the user may push down the tail bar 48 until the latch 90 engages the tail bar 48 and the tail bar 48 becomes seated in the receiver 78. The cover 20 is now in the closed position 36. Additionally, the spring-biased piston 114 is now in the actuated position 128. As described above, the underside of the cover 20 may include adhesive such as a hook and latch fastener, which may be pressed down along the right side wall 26 and the left side wall 28. To remove the cover 20 from the closed position 36, the user pulls on the handle 140 of the latch 90 and the latch 90 will disengage from the striker 141 of the tail bar 48 and the tail bar 48 will become unseated from the receiver 48. The cover 20 is now in the open position 130 where the tail bar 48 is unseated from the receiver 48 and the spring-biased mechanism 114 is in the rest position 132. Once the user moves the cover to the open position 130, the user may then roll up the cover 20 as desired.

In order to change the receiver 78, the anchor 86, and the mechanism 84 from the initial adjustment position 142 to the final adjustment position 144, the user may move the move to the open position 130 and partially roll up the cover 20 such that the mechanism 84 along with the block 76 is exposed. The mechanism 84 can then be adjusted by moving the adjustment nut 112 along the threaded portion 116 of the spring biased mechanism 114 which moves the receiver 78, the anchor 86, and the latch 90 as a unit in order to provide adjustment. The spring bias piston 114 includes gradient markings 96 in order for a user to move the mechanism on the first side rail 42 to a certain gradient marker and easily match the adjustment to the gradient markings 96 on the second spring bias piston 115 on the second side rail 44 to make sure the tail bar 48 will be even when seated in the first receiver 78 and the second receiver 79. Once the user has adjusted the mechanism 84, the receiver 78, the anchor 86, and the latch 90 along with the second mechanism 85, the second receiver 79, and the holder as desired between the initial adjustment position 142 and the final adjustment position 144, the cover 20 may be completely unrolled and the tail bar 48 may be placed about the receiver 78. Then the user may push the handle 140 of the latch 90, or press the tail bar 48 down so the latch 90 engages with the striker 141, until the cover 20 is in the closed position 36. This procedure may be repeated until the desired adjustment has been reached.

The present invention has been described in illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A tonneau cover system comprising:
a frame having a header, a tail bar, and first and second side rails with said first side rail defining at least one slot;
a cover disposed over and coupled to said frame when in a closed position;
a block fixed to said first side rail;
a receiver slidably coupled to said first side rail about said slot with said receiver coupled to said block, and said tail bar seated with said receiver when said cover is in said closed position;
an anchor slidably coupled to said first side rail about said slot with said anchor engaged with said receiver;
a latch coupled to one of said receiver and said anchor and disposed through said slot with said latch engaging said tail bar when said tail bar is seated in said receiver and said cover is in said closed position;
a mechanism disposed between said block and said receiver to provide adjustment to said tail bar by moving said receiver, said anchor, and said latch as a unit between an initial adjustment position and a final adjustment position with said mechanism also providing tension to said cover when said cover is in said closed position.

2. The tonneau cover system of claim 1, wherein said mechanism provides tension to said cover between a first tension position and a second tension position.

3. The tonneau cover system of claim 2, wherein said mechanism moves between said first tension position and said second tension position automatically.

4. The tonneau cover system of claim 1, wherein said mechanism includes a spring biased piston and an adjustment nut.

5. The tonneau cover system of claim 4, wherein said spring biased piston includes a threaded portion defining an interior cavity with a rod partially disposed within said interior cavity.

6. The tonneau cover system of claim 5, wherein said spring biased piston further includes a spring disposed in said interior cavity abutting said rod to bias said rod out of said interior cavity.

7. The tonneau cover system of claim 5, wherein said rod of said spring biased piston has an enlarged end secured within said receiver.

8. The tonneau cover system of claim 5, wherein said spring biased piston further includes a cap mounted to said threaded portion to close one end of said interior cavity.

9. The tonneau cover system of claim 5, wherein said block defines a bore having said threaded portion of said spring biased piston disposed there through with said adjustment nut disposed about said threaded portion.

10. The tonneau cover system of claim 1, wherein said block defines a channel having an adjustment nut disposed therein.

11. The tonneau cover system of claim 1, wherein said second side rail includes a second block, a second mechanism, a second receiver, and a holder.

12. The tonneau cover system of claim 11, wherein said second mechanism further includes a second spring biased piston having a second cap mounted to a second threaded portion to close one end of a second interior cavity.

13. The tonneau cover system of claim 12, wherein said cap of said spring biased piston includes a first set of gradient markings and wherein said second cap of said second spring biased piston includes a second set of gradient markings such that said mechanisms can align to provide even adjustment to said tail bar.

14. The tonneau cover system of claim 4, further including gradient markings disposed along a length of said spring biased piston.

15. The tonneau cover system of claim 1, wherein said latch is pivotally mounted on said anchor.

16. The tonneau cover system of claim 1, wherein said cover is in an open position when said tail bar is unseated from said receiver.

17. The tonneau cover system of claim 16, wherein said spring biased piston is in a rest position when said cover is in said open position.

18. The tonneau cover system of claim 4, wherein said spring biased piston is in an actuated position when said cover is in said closed position.

19. The tonneau cover system of claim 1, further including a spring bias mechanism engaging said latch.

20. The tonneau cover system of claim 19, wherein said spring bias mechanism is a flat spring biasing said latch toward a locked position.

21. The tonneau cover of claim 19, further including a fastener disposed through said spring bias mechanism, said receiver, and said anchor.

22. The tonneau cover system of claim 1, wherein said latch comprises a handle for a user to engage or disengage said latch from said tail bar, a pawl to engage said tail bar, and a tab to engage a spring.

23. The tonneau cover system of claim 1, wherein said first side rail has an extrusion portion with a top face and a bottom face, said receiver is disposed about said top face of said extrusion portion, and said anchor is disposed about said bottom face of said extrusion portion.

* * * * *

UNITED STATES PATENT AND TRADEMARK OFFICE
CERTIFICATE OF CORRECTION

| | |
|---|---|
| PATENT NO. | : 9,908,391 B2 |
| APPLICATION NO. | : 15/405107 |
| DATED | : March 6, 2018 |
| INVENTOR(S) | : Scott Williamson et al. |

It is certified that error appears in the above-identified patent and that said Letters Patent is hereby corrected as shown below:

In the Claims

Column 10, Claim 21, Line 12, after "cover", insert --system--

Signed and Sealed this
Twenty-ninth Day of May, 2018

Andrei Iancu
*Director of the United States Patent and Trademark Office*